United States Patent
Gaertner et al.

(10) Patent No.: US 10,861,490 B1
(45) Date of Patent: Dec. 8, 2020

(54) MULTI-CONTROLLER DATA STORAGE DEVICES AND METHODS

(71) Applicant: Seagate Technology LLC, Cupertino, CA (US)

(72) Inventors: Mark A. Gaertner, Vadnais Heights, MN (US); Jon D. Trantham, Chanhassen, MN (US); Vidur Parkash, Shakopee, MN (US); Kevin N. Dao, Apple Valley, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/538,180

(22) Filed: Aug. 12, 2019

(51) Int. Cl.
| | |
|---|---|
| *G11B 5/54* | (2006.01) |
| *G11B 5/55* | (2006.01) |
| *G06F 15/78* | (2006.01) |
| *G06F 3/06* | (2006.01) |

(52) U.S. Cl.
CPC .......... *G11B 5/5526* (2013.01); *G06F 3/0604* (2013.01); *G06F 3/0658* (2013.01); *G06F 3/0674* (2013.01); *G06F 15/7807* (2013.01); *G11B 5/5569* (2013.01)

(58) Field of Classification Search
USPC ...................................................... 360/75, 39
See application file for complete search history.

(56) References Cited

U.S. PATENT DOCUMENTS

| | | | |
|---|---|---|---|
| 5,261,058 A | 11/1993 | Squires et al. | |
| 5,610,808 A * | 3/1997 | Squires ................. | G06F 3/0676 700/2 |
| 5,901,010 A | 5/1999 | Glover et al. | |
| 6,493,176 B1 * | 12/2002 | Deng ................... | G11B 5/5552 360/48 |
| 7,102,842 B1 * | 9/2006 | Howard ............... | G11B 5/5521 360/61 |
| 9,361,919 B1 | 6/2016 | Lieu et al. | |
| 9,792,938 B1 | 10/2017 | Kobayashi et al. | |
| 9,911,442 B1 | 3/2018 | Kharisov et al. | |
| 10,042,785 B1 * | 8/2018 | Buch .................... | G06F 3/0659 |
| 10,090,010 B1 | 10/2018 | Erden | |
| 10,255,943 B1 | 4/2019 | Schick et al. | |
| 2008/0225431 A1 | 9/2008 | Craig et al. | |
| 2012/0117305 A1 * | 5/2012 | Arya ...................... | G06F 12/06 711/103 |

* cited by examiner

*Primary Examiner* — Nabil Z Hindi
(74) *Attorney, Agent, or Firm* — Faegre Drinker Biddle & Reath

(57) ABSTRACT

A data storage device including an interface, a first actuator, a second actuator, an auxiliary controller, and a primary controller. The auxiliary controller is configured to control positioning of the second actuator. The primary controller is configured to control positioning of the first actuator. The primary controller is communicatively coupled between the interface and the auxiliary controller.

20 Claims, 4 Drawing Sheets

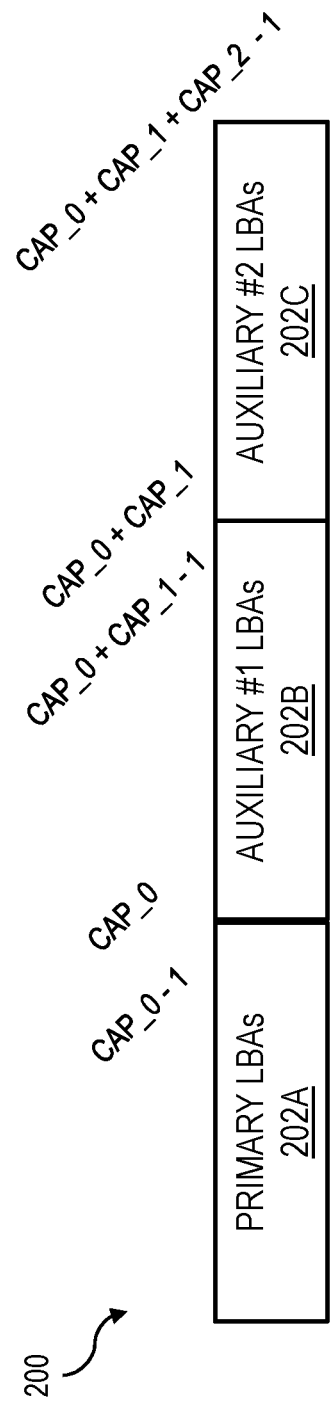

MULTI-CONTROLLER DATA STORAGE DEVICES AND METHODS

In certain embodiments, a data storage device including an interface, a first actuator, a second actuator, an auxiliary controller, and a primary controller. The auxiliary controller is configured to control positioning of the second actuator. The primary controller is configured to control positioning of the first actuator. The primary controller is communicatively coupled between the interface and the auxiliary controller.

In certain embodiments, a method for use with a data storage device is disclosed. The data storage device includes a primary controller for controlling a first actuator and an auxiliary controller for controlling a second actuator. The method includes receiving, via an interface of the primary controller, data from a host device designated for the second actuator. The method further includes passing the received data from the primary controller to the auxiliary controller for storage to a magnetic recording medium via the second actuator.

In certain embodiments, a chip package includes a primary controller and an auxiliary controller. The primary controller has circuitry, which includes an interface, a first controller processor, a first servo processor, and a first read/write channel. The auxiliary controller is communicatively coupled to the primary controller and has circuitry, which includes a second controller processor, a second servo processor, and a second read/write channel.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 2 shows an example arrangement of logical block addresses, in accordance with certain embodiments of the present disclosure.

FIG. 3 shows another example arrangement of logical block addresses, in accordance with certain embodiments of the present disclosure.

Figure 1:
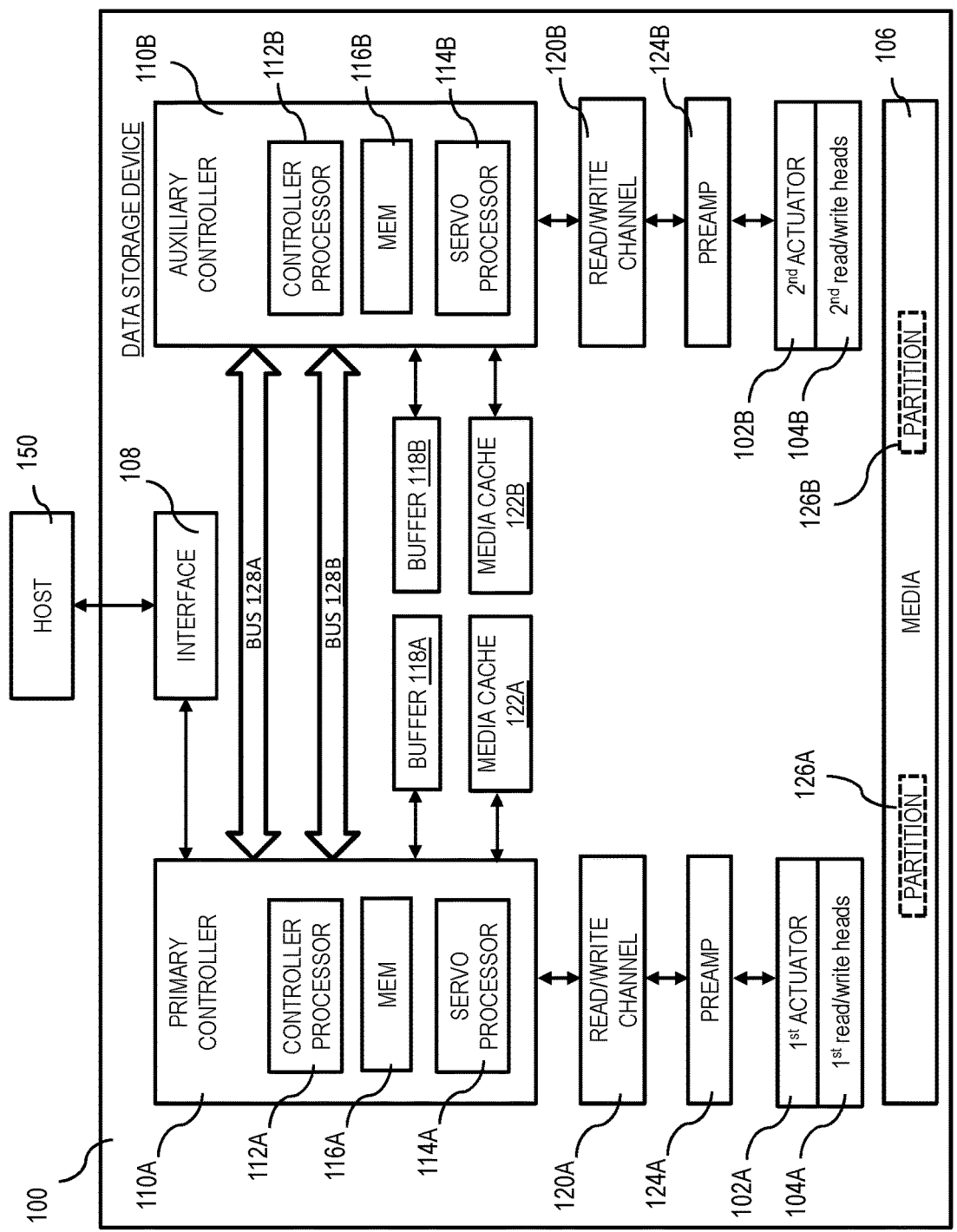
FIG. 1 shows a simplified schematic of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage devices such as hard disk drives can include multiple actuators that are operated and accessed in parallel to increase the amount of data that can be accessed over time. Each actuator includes one or more read/write heads that include transducers that either write data to or read data from magnetic storage media. These data storage devices use a single controller to control and process data from the multiple actuators and read/write heads. Certain embodiments of the present disclosure involve approaches for using multiple controllers to control the actuators and process data within the data storage device.

FIG. 1 shows a schematic of a hard disk drive 100 that includes a first actuator 102A and a second actuator 102B each coupled to one or more read/write heads 104A and 104B to provide concurrent access to magnetic recording media 106. In certain embodiments, the multiple actuators 102A and 102B share a common pivot axis and are positioned in a stacked arrangement. In such embodiments, the read/write heads 104A coupled to the first actuator 102A access different surfaces of the magnetic recording media 106 than the read/write heads 104B coupled to the second actuator 102B. In other embodiments, the multiple actuators 102A and 102B have separate pivot axes. In such embodiments, the read/write heads 104A coupled to the first actuator 102A may access the same magnetic recording media 106 as the read/write heads 104B coupled to the second actuator 102B. Although only two actuators for the data storage device 100 are shown in FIG. 1, additional actuators can be incorporated into the data storage device 100 as is described in more detail with respect to FIGS. 4 and 5.

The data storage device 100 includes an interface 108 (e.g., an input/output interface) for transferring data to and from the data storage device 100. For example, the interface 108, among other features, can be communicatively coupled between a host 150 (e.g., a data storage system such as a server or laptop) and the read/write heads 104A and 104B to facilitate communication between the read/write heads 104A and 104B and the host 150.

The data storage device 100 includes a primary controller 110A and an auxiliary controller 110B. As will be described in more detail below, the primary controller 110A performs more functions than the auxiliary controller 110B.

Each controller 110A and 110B includes at least one controller processor 112A and 112B (e.g., a microprocessor), at least one servo processor 114A and 114B (e.g., a microprocessor), and at least one memory component 116A, 116B (e.g., volatile memory such as a dynamic random access memory ("DRAM"), static random access memory ("SRAM"), and the like). In certain embodiments, a separate respective bank of memory is dedicated to the controller processors 112A and 112B and to the servo processors 114A and 114B, although the memory 116A and 116B can be shared among processors of the respective controllers 110A and 110B.

Each controller 110A and 110B can be coupled to and control access to respective buffers 118A and 118B (or a shared buffer), which can temporarily store data associated with read commands and write commands. The buffers 118A and 118B can be a volatile memory, such as DRAM, SRAM, and the like. Further, each controller 110A and 110B can be coupled to respective read/write channels 120A and 120B. Each controller can also be coupled to respective media caches 122A and 122B. The media caches 122A and 112B may be a partition of the magnetic recording media 106 that is reserved for the media caches 122A and 122B. The media caches 122A and 122B may be used to store a large amount of data to be readily accessible, available, and aggregated, potentially reducing the time required to carry out data transfer commands.

The primary controller's controller processor 112A and the auxiliary controller's controller processor 112B are configured to manage access to the magnetic recording media 106. For example, the controller processors 112A and 112B manage dataflow operations, manage access to the respective buffers 118A and 118B, and control the respective read/write channels 120A and 120B.

The primary controller's servo processor 114A and the auxiliary controller's servo processor 114B are configured to control operations of the respective first and second actuators 102A and 102B (and any microactuators coupled to the first and second actuators 102A and 102B) such as track seeking operations, track following operations, and track settling operations. In certain embodiments, the servo processors 114A and 114B control operations of respective pre-amplifiers 124A and 124B, which provide signals to the read/write heads 104A and 104B for writing magnetic transitions to the magnetic recording media 106 and receive signals from the read/write heads 104A and 104B in response to detecting magnetic transitions on the magnetic recording media 106.

In addition to performing functions similar to the auxiliary controller 110B, the primary controller 110A is assigned additional duties. For example, the primary controller 110A can manage communications with the host 150, operations of the data storage device's spindle motor (not shown), and interactions between or among the actuators. Having the primary controller 110A manage such functions allows the use of multiple controllers without requiring changes to traditional data storage device components such as the interface 108.

As shown in FIG. 1, the primary controller 110A is the only controller coupled to the interface 108. As such, the primary controller 110A manages communications between the data storage device 100 and the host 150. The communications can be governed by one of the standardized communication protocols such as SAS, SATA, NVMe, etc.

The primary controller 110A, via the controller processor 112A, also controls scheduling of data transfer commands (e.g., read commands or write commands). During operation, the data storage device 100 receives various data transfer commands from the host 150. In a multi-actuator data storage device 100, the host 150 may view each actuator 102A and 102B of the data storage device 100 as a separate data storage device (e.g., a separate logical unit number (LUN)). As such, each data transfer command may be directed to a particular actuator (e.g., a read command for data accessible by the first actuator 102A, or a write command to write data to media accessible by the second actuator 102B). In operation, data associated with a write command may be received from the host 150 by the interface 108. In certain embodiments, the controller processor 112A determines, based on the incoming command, whether the received data should be initially stored on the buffer 118A associated with the primary controller 110A or the buffer 118B associated with the auxiliary controller 110B. Commands issued by the host 150 to the first actuator 102A will be directed to the primary controller 110A and the buffer 118A. In certain embodiments, the controller processor 112A stores data intended for the second actuator 102B in its buffer 118A before being transferred from buffer 118A to buffer 118B with joint control by controller processors 112A and 112B or sole control by the controller processor 112A of the primary controller 110A.

The received data can be encoded or otherwise processed by one of the respective read/write channels 120A and 120B and eventually stored to the magnetic recording media 106 via one of the read/write heads 104A or 104B coupled to the respective first actuator 102A and the second actuator 102B. In certain embodiments, the received data is stored to the media caches 122A and 122B before its final position on the magnetic recording media 106. As will be described in more detail below, the first and second actuators 102A and 102B are assigned particular areas (e.g., logical block address (LBA) space) of the magnetic recording media 106. Once a command is received by the primary controller 110A, the primary controller 110A directs the received data to an LBA on the magnetic recording media 106.

Data associated with a read command may be retrieved from the magnetic recording media 106 or the media caches 122A and 122B and stored in one or more of the buffers 118A and 118B. Such data is then transferred to the host 150 by the interface 108 via the primary controller 110A.

The primary controller 110A is also configured to control operations of the data storage device's spindle motor (not shown). For example, the primary controller 110A can control the speed of the spindle motor, when the spindle motor spins up and spins down, and different power modes (e.g., power-saving mode) of the spindle motor. The primary controller 110A can also maintain the device-level logs (e.g., error logs) of the data storage device 100.

In certain embodiments, both the primary controller 110A and the auxiliary controller 110B run the same firmware image. Running the same firmware image on the multiple controllers is more simple and thus easier to manufacture. When the data storage device 100 is booted up, the controllers configure themselves as the primary controller 110A and the auxiliary controller 110B. Both the primary controller 110A and the auxiliary controller 110B can be configured to be aware of the capacity and the disk-geometry data of each other. Further, both the primary controller 110A and the auxiliary controller 110B, via their respective controller processors 112A and 112B, are configured to be aware of defect sectors (which may be stored in one or more flaw maps/tables) present in the magnetic recording media 106 (e.g., defects on each surface of the magnetic recording media 106). For example, the recorded defect sectors may be copied and stored on partitions 126A and 126B reserved on the magnetic recording media 106 for the respective first and second actuators 102A and 102B. These reserved partitions 126A and 126B can be small portions of the magnetic recording media 106 of identical size (e.g., number of sectors), identical LBA layout, and dedicated for use with respective individual first and second actuators 102A and 102B. For example, although identical in layout to the reserved partition 126B associated with the second actuator 102B, the reserved partition 126A would only be accessed by the first read/write heads 104A on the first actuator 102A.

As shown in FIG. 1, the data storage device 100 includes a first data bus 128A and a second data bus 128B coupled between the primary controller 110A and the auxiliary controller 110B. The data buses 128A and 128B enable communication (e.g., inter-controller communication) between the primary controller 110A and the auxiliary controller 110B.

In certain embodiments, the first data bus 128A is a low-latency data bus. Low-latency data buses are configured to transfer up to a few hundred bytes of data relatively quickly. For example, a low-latency data bus can be used to transfer critical, time-sensitive data between the primary controller 110A and the auxiliary controller 110B. Such data could include operational data like feed-forward data (e.g., feedback from servo wedges on the magnetic recording media 106) for the servo processors 114A and 114B or metadata needed in the event of a power loss during which the data storage device 100 needs to invoke safety routines to protect the data storage device 100 and its data.

In certain embodiments, the second data bus 128B is a general purpose data bus configured to transfer larger bandwidths than the low-latency data bus. The general purpose data bus can be used to transfer user data between the primary controller 110A and the auxiliary controller 110B. The general purpose data bus can transfer byte data as well as sector data. Example general purpose buses include buses configured to communicate using a standard protocol such as SAS buses, SATA busses, or PCI-E buses.

In certain embodiments, the primary controller 110A is a system on a chip ("SOC"), which includes the interface 108 and the read/write channel 120A. In certain embodiments, the auxiliary controller 110B is an SOC, which includes the read/write channel 120B. In certain embodiments, the primary controller 110A and the auxiliary controller 110B are separate portions of the same SOC. In other embodiments, the primary controller 110A and the auxiliary controller 110B are separate SOCs that reside on separate physical chips. In certain embodiments, the primary controller 110A and the auxiliary controller 110B are formed on the same chip package but are physically separated on that chip package. The primary controller 110A and the auxiliary controller 110B are communicatively coupled to each other.

Regardless of the physical arrangement of the primary controller 110A and the auxiliary controller 110B, the one or more SOCs may be an integrated circuit such as an application-specific integrated circuit ("ASIC") and a field-programmable gate array ("FPGA") that include instructions for carrying out various functions of the primary controller 110A and the auxiliary controller 110B and, ultimately, the data storage device 100.

As mentioned above, the first and second actuators 102A and 102B are assigned particular LBA space on the magnetic recording media 106. FIGS. 2 and 3 show schematics of example LBA arrangements. These schematics use, as an example and for clarity of the LBA arrangements, data storage devices with three actuators. The schematics can apply to data storage devices with two actuators or more than three actuators.

FIG. 2 shows an example of a flat LBA space arrangement 200. The LBA space arrangement 200 includes a first LBA group 202A, a second LBA group 202B, and a third LBA group 202C. In this arrangement 200, each LBA in the data storage device 100 is assigned a unique numbering according to a set of rules to define the first and last LBAs for each LBA group 202A, 202B, etc. The rules include the first LBA of the primary controller 110A always being set to 0 such that LBA=0 does not exist on any of the auxiliary controller sectors. The last LBA associated with the primary controller 110A is set to CAP_0 minus 1, where CAP_0 is the number of LBAs present for the primary controller 110A (e.g., the LBA capacity associated with the primary controller 110A). The rules also include the first LBA of the auxiliary controller 110B being set to CAP_0. The last LBA of the auxiliary controller 110B is the first LBA of the auxiliary controller 110B plus CAP_1 minus 1, where CAP_1 is the last LBA present for the auxiliary controller 110B. If the data storage device 100 included a third actuator, the rules would include the first LBA of the second auxiliary controller being set to CAP_0 plus CAP_1.

FIG. 3 shows an example of an interleaved LBA space arrangement 300. The LBA space arrangement 300 includes a first LBA group 302A associated with the primary controller 110A, a first LBA group 302B associated with the auxiliary controller 110B, (if the data storage device 100 included a third actuator and therefore second auxiliary controller) a first LBA group 302C associated with the second auxiliary controller, a second LBA group 302D associated with the primary controller 110A, a second LBA group 302E associated with the auxiliary controller 110B, and a second LBA group 302F associated with the second auxiliary controller. In this arrangement 300, each LBA in the data storage device 100 is assigned a unique numbering according to a set of rules to define the first and last LBAs for each LBA group (302A, 302B, etc.). In this arrangement 300, similar to the arrangement 200 shown in FIG. 2, each LBA is assigned a unique numbering. In the arrangement 200, the progression of the LBA numbering is interleaved to a specific actuator every N sectors such that CAP_X=N×M, where N is the size of the interleave and M is the number of interleaves. In certain embodiments, the size of the interleave is static while in other embodiments the size is dynamic.

In both LBA arrangements 200 and 300, when the data storage device 100 receives a command, the primary controller 110A directs data associated with the command a set of LBAs associated with the intended actuator. For example, if the host 150 sent a write command intended for the first actuator 102A, the primary controller 110A would direct the data associated with the write command to a block of LBAs within the LBA groups assigned to the first actuator 102A.

Figure 4:
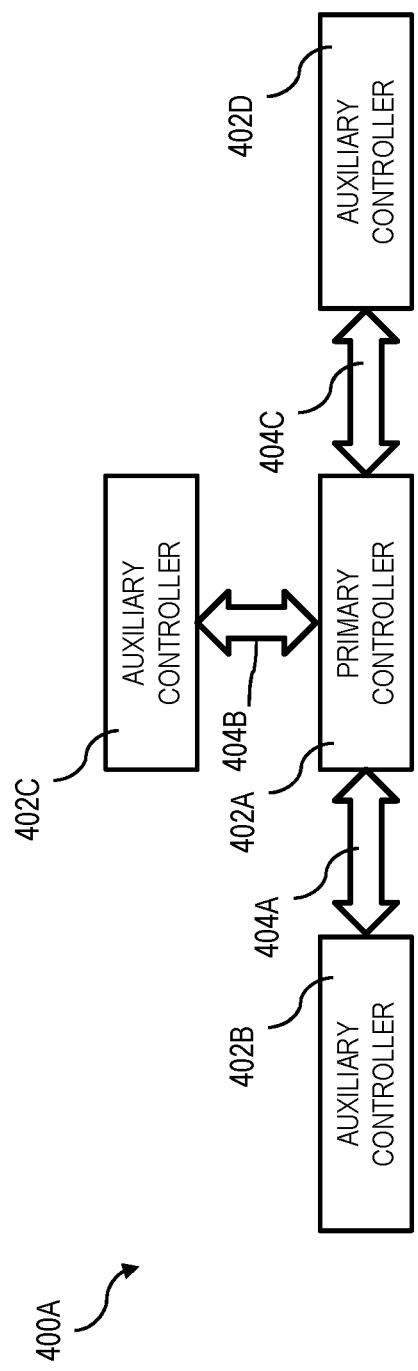
FIGS. 4 and 5 show schematics of controllers coupled together, in accordance with certain embodiments of the present disclosure.
Figure 5:
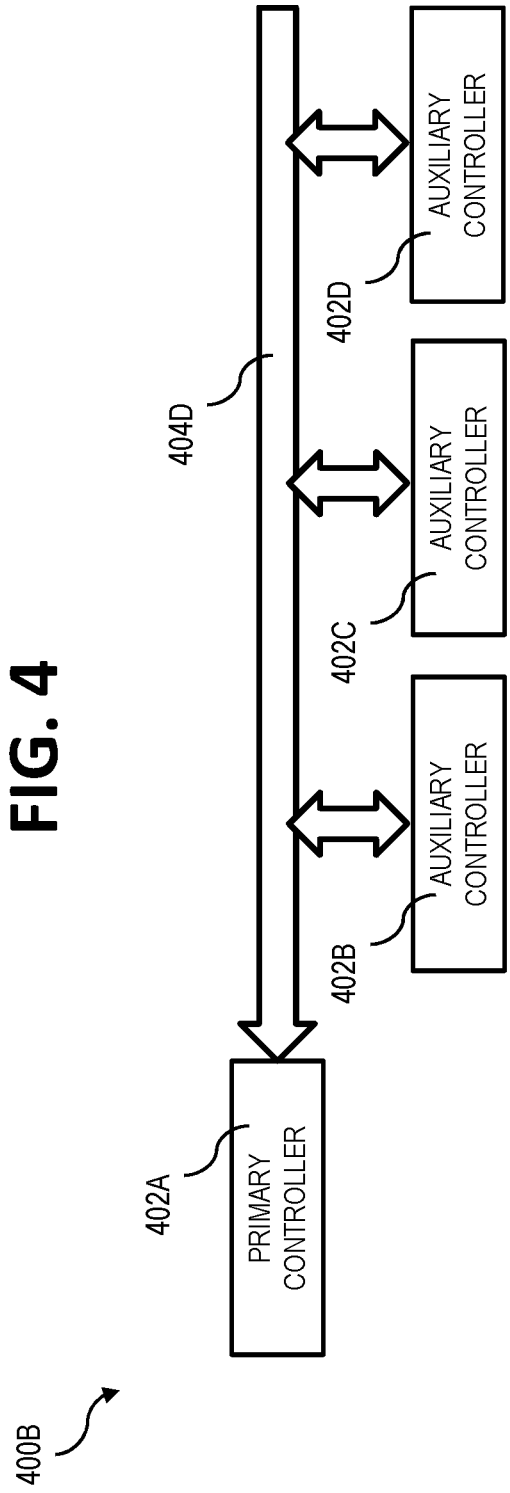

FIGS. 4 and 5 show example arrangements 400A and 400B of controllers for data storage devices utilizing four controllers. In certain embodiments, a data storage device such as the data storage device 100 of FIG. 1 includes four actuators. In such embodiments, the data storage device can include a separate controller for each actuator. As shown in FIGS. 4 and 5, the four controllers include one primary controller 402A and three auxiliary controllers 402B, 402C, and 402D. The primary controller 402A can include the same or similar features of the primary controller 110A of FIG. 1, including a controller processor, memory, servo processor, interface, and read/write channel. The auxiliary controllers 402B-D can include the same or similar features of the auxiliary controller 110B of FIG. 1, including a controller processor, memory, servo processor, and read/write channel.

In FIG. 4, the arrangement 400A of controllers shows the controllers 402A-D coupled together in a star topology arrangement. The auxiliary controllers 402B-D are each communicatively coupled to the primary controller 410A directly such that no auxiliary controllers are coupled between another auxiliary controller and the primary controller 402A. The arrangement 400A shows the controllers being communicatively coupled together via buses 404A-C. In certain embodiments, each 404A-C represents multiple buses (e.g., one or more low-latency buses and one or more general purpose buses).

In FIG. 5, the arrangement 400B of controllers shows the auxiliary controllers 402B-D communicatively coupled to the primary controller 402A via a shared bus 404D. In certain embodiments, the shared bus 404D represents multiple buses (e.g., one or more low-latency buses and one or more general purpose buses).

Figure 6:
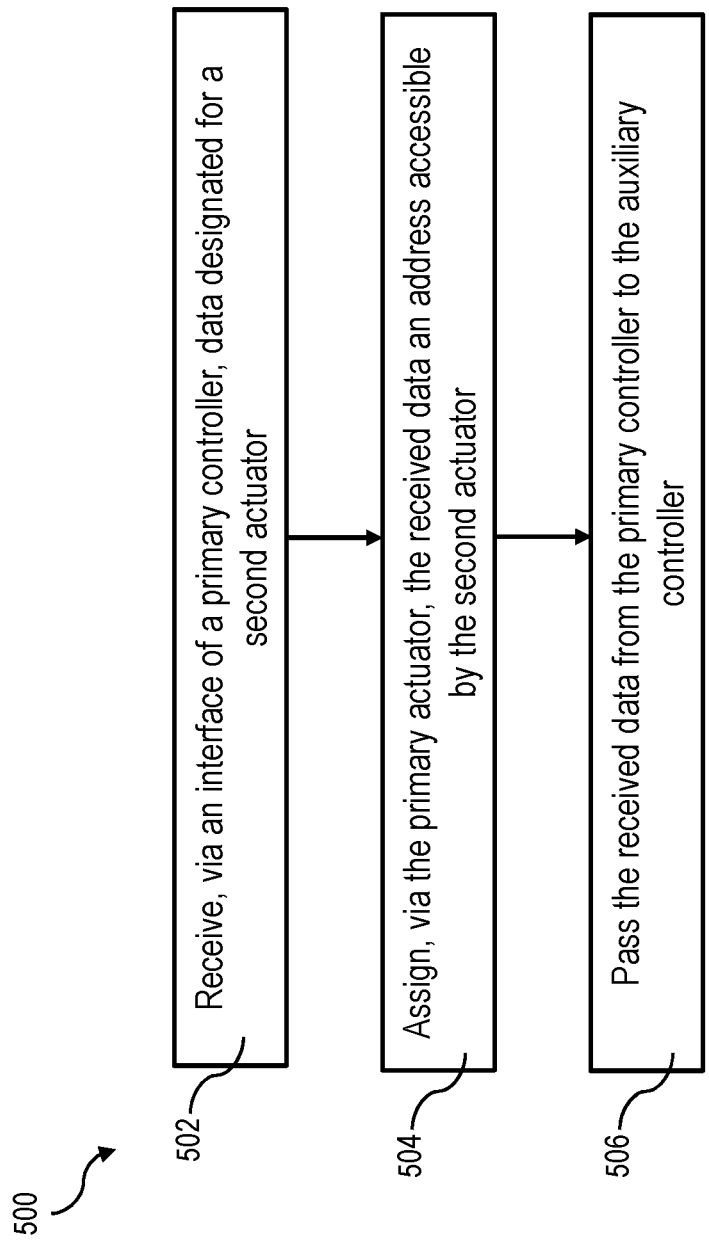
FIG. 6 depicts a block diagram of steps of a method for transferring data within the data storage device of FIG. 1, in accordance with certain embodiments of the present disclosure.

FIG. 6 outlines a method 500 for transferring data within the data storage device 100. The method 500 involves a data transfer command for writing data to the magnetic recording media 106. The method 500 includes receiving, via the interface 108 of the primary controller 100A, data from the host 150 that is designated for the second actuator 102B (block 502 in FIG. 6). The data received by the primary controller 110A is directed an address (e.g., an LBA range) accessible by the second actuator 102B (block 504 in FIG. 6). The received data is passed from the primary controller 110A to the auxiliary controller 110B for storage to the magnetic recording medium 106 via the second actuator 102B (block 506 in FIG. 6).

For data read commands, the data storage device 100 can receive the read command, via the interface 108, from the host 150 for data assigned to the second actuator 102B. The requested data can be retrieved via the second actuator 102B and passed from the auxiliary controller 110B to the primary controller 110A.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A data storage device comprising:
   an interface;
   a first actuator;
   a second actuator;
   an auxiliary controller configured to control positioning of the second actuator; and
   a primary controller configured to control positioning of the first actuator, the primary controller is communicatively coupled between the interface and the auxiliary controller, the primary controller is configured to transfer all data transfers to and from the data storage device.

2. The data storage device of claim 1, wherein the primary controller is configured to control operation of a spindle motor.

3. The data storage device of claim 1, wherein the primary controller is configured to manage data transfers communicated through the primary controller and the auxiliary controller.

4. The data storage device of claim 1, wherein the primary controller and the auxiliary controller include separate read/write channels.

5. The data storage device of claim 1, wherein the primary controller and the auxiliary controller include separate servo processors.

6. The data storage device of claim 1, wherein the primary controller and the auxiliary controller access a shared defect table or duplicate defect tables.

7. The data storage device of claim 1, wherein the primary controller and the auxiliary controller are communicatively coupled to each other via a first bus and a second bus.

8. The data storage device of claim 7, wherein the first bus has a lower latency and a lower bandwidth than the second bus.

9. The data storage device of claim 7, wherein the first bus is configured to communicate operational data, wherein the second bus is configured to communicate user data.

10. The data storage device of claim 1, wherein the first actuator is assigned a first set of sequential logical block addresses, wherein the second actuator is assigned a second set of sequential logical block addresses.

11. The data storage device of claim 1, wherein the first actuator and the second actuator are assigned interleaved logical block addresses.

12. The data storage device of claim 1, wherein the auxiliary controller and the primary controller are part of a single chip.

13. The data storage device of claim 1, wherein the auxiliary controller and the primary controller are part of separate chips.

14. The data storage device of claim 13, wherein the separate chips are part of a single package.

15. A method for use with a data storage device with a primary controller for controlling a first actuator and with an auxiliary controller for controlling a second actuator, the method comprising:
   receiving, via an interface of the primary controller, data from a host device designated for the second actuator; and
   passing the received data from the primary controller to the auxiliary controller for storage to a magnetic recording medium via the second actuator.

16. The method of claim 15, further comprising:
   receiving, via the interface, a read command from the host for data assigned to the second actuator;
   retrieving, via the second actuator, data requested by the read command; and
   passing the retrieved data from the auxiliary controller to the primary controller.

17. The method of claim 15, further comprising:
   directing, via the primary controller, the received data an address accessible by the second actuator.

18. The data storage device of claim 1, wherein
   the primary controller includes circuitry comprising the interface, a first controller processor, a first servo processor, and a first read/write channel, wherein the auxiliary controller includes circuitry comprising a second controller processor, a second servo processor, and a second read/write channel.

19. The data storage device of claim 18, wherein the primary controller is a first system on a chip, wherein the auxiliary controller is a second system on a chip.

20. The data storage device of claim 1, wherein the auxiliary controller is not directly communicatively coupled to the interface.

* * * * *